Sept. 11, 1923.                                              1,467,353
                         H. P. CHILDRESS
                         AUTOMOBILE LOCK
                      Original Filed Sept. 18, 1920
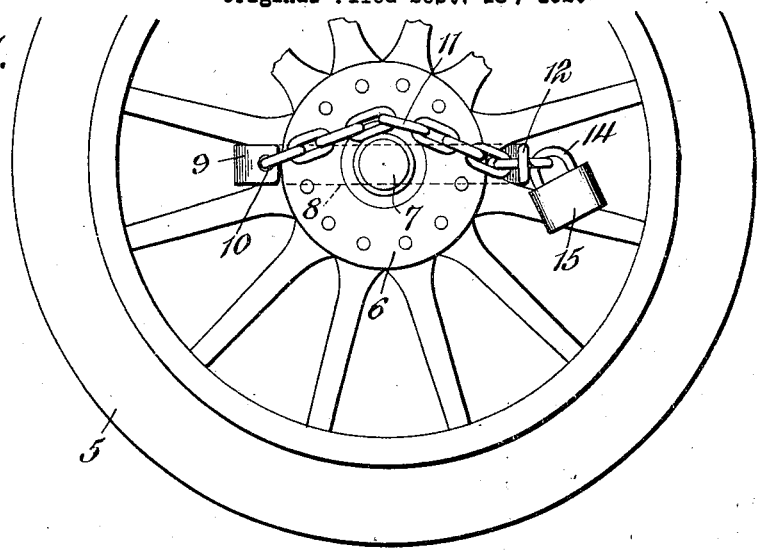
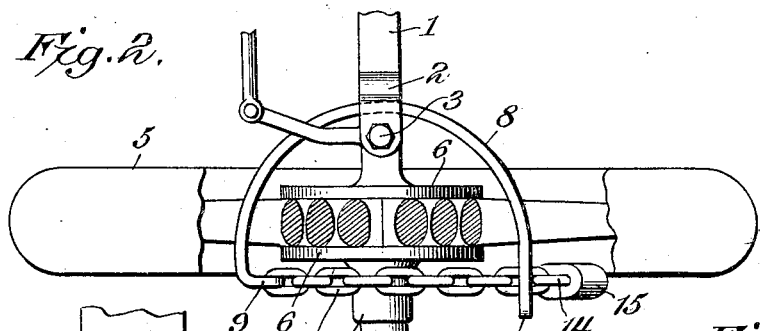
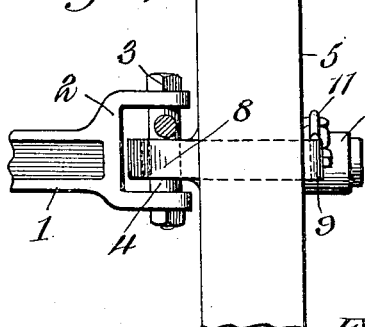
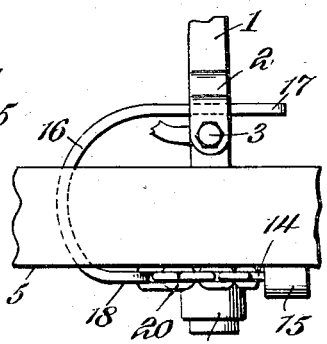
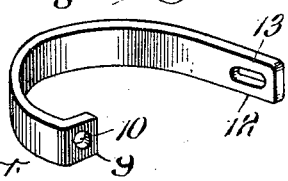
H. P. Childress, INVENTOR,
WITNESSES
BY
ATTORNEY Patented Sept. 11, 1923.

1,467,353

UNITED STATES PATENT OFFICE.

HENDERSON PIERCE CHILDRESS, OF MEMPHIS, TENNESSEE.

AUTOMOBILE LOCK.

Application filed September 18, 1920, Serial No. 411,037. Renewed April 26, 1923.

*To all whom it may concern:*

Be it known that I, HENDERSON P. CHILDRESS, a citizen of the United States, residing at Memphis, in the county of Shelby and State of Tennessee, have invented a new and useful Automobile Lock, of which the following is a specification.

This invention relates to automobile lock.

The object is to provide a locking device for engagement with either of the front steering wheels of an automobile of any of the well-known makes whereby the same is prevented from turning action upon the wheel spindle, and but a limited amount of steering action is permitted.

To this end I provide a device which is introduced between the spokes of one of the steering wheels in a manner to engage between the forked end of the front axle and the steering knuckle thereof, while the ends of the device project outwardly through the spokes of the said wheel where they are joined together by a strong, flexible connection, such as a short length of chain, said connection being permanently secured to one end of the said device and bearing upon or completely surrounding the projecting portion of the wheel hub, and detachably connected to the other end of the device by means of any desired form of padlock; the said chain being readily disengaged from the hub, after the padlock has been removed, to free the ends of the device from between the spokes, when it is desired to remove the lock from its operative position upon the wheel.

A full and complete understanding of the invention may be obtained from a consideration of the following detailed description taken in connection with the accompanying drawing forming part of this specification, with the understanding, however, that the invention is not confined to strict conformity with the showing of the drawing, but may be changed or modified so long as such changes and modifications mark no material departure from the salient features of the invention as expressed in the appended claims.

In the drawing, in which similar reference characters designate corresponding parts throughout the several figures:—

Figure 1 is a side elevation, partly broken away, of a front steering wheel of an automobile having the improved lock applied thereto;

Figure 2 is a plan view of the same, parts being broken away to disclose the invention;

Figure 3 is a detail front elevation of the same;

Figure 4 is a detail perspective view of the locking bar of the device;

Figure 5 is a detail side elevation of the hub portion of a wheel having a slightly modified form of the device applied thereto, the spokes and rim of the wheel being omitted;

Figure 6 is a plan view of the same.

Various devices have been suggested for preventing the surreptitious manipulation of the steering mechanism of automobiles, which either aim to render impossible the turning of the steering wheel by attachment to some part thereof, or to some other of the relatively movable parts of the steering mechanism, or which may cause the automobile to travel in a continuous circle, thus giving notice that the car is being handled by unauthorized persons; but with all such precautions, cars are continually being stolen, and it is my experience and observation that a lock which actually prevents a steering wheel to which it is applied from turning, is most effective in preventing such thefts.

The device of the present invention is designed as a steering wheel lock, and is adapted to engage the same in such manner as to prevent it from turning upon its axis, and the device is so shaped and applied in locking position, as to further prevent any appreciable movement of the said wheel about its knuckle pin for the purpose of changing its steering direction.

In the drawing there is illustrated a portion of the front axle 1 of an ordinary car, said axle having the usual forked end 2 formed with upper and lower bearings for the reception of the vertically disposed knuckle pin 3, which traverses the knuckle 4 located between the bearings of the forked end 2, and having formed integrally therewith the usual horizontally disposed spindle for the reception of the front steering wheel 5.

The wheel 5 includes the usual circular spoke-clamping plates or discs 6, which serve to maintain the said spokes in position, and the outwardly extending hub portion 7, all of which is of ordinary construction and may be found on the majority of automobiles.

The improved lock comprises a curved bar or locking member 8 formed of some strong metal preferably hardened to prevent cutting or filing the same, and of sufficient weight and strength to withstand the strain to which it may be subjected in attempts to steal the automobile, the said bar being preferably about one-half inch in thickness by about one and one-half to two inches in width.

The curved bar 8 is substantially semicircular or U-shaped, and is of a diameter somewhat greater than the diameters of the aforesaid clamping plates or discs 6, and has one of the ends bent radially at substantially a right angle and directed towards the center of the curve, as indicated at 9, the said bent end being provided with an aperture 10, to which is permanently attached one terminal link of a short length of chain 11.

The other free end 12 of the curved bar 8 is arranged straight for a short distance or tangential to the main curved body portion of the same, and substantially at a right angle to the angularly bent end 9, and has, adjacent to its end, an elongated slot 13, arranged longitudinally thereof, which slot is of a length to freely allow the passage, endwise, of the free terminal link of the chain, as clearly illustrated in Figure 2 of the drawing.

In applying the locking device to the front wheel of an automobile, it is only necessary to introduce the straight end 12 thereof between two of the spokes, either in front or rear of the adjacent axle, and, by arcuately swinging the bar 8 to pass the said end 12 between the fork-end 2 of the axle and the knuckle 4, and to continue the movement until the straight end 12 is brought outwardly between two opposite spokes when the chain 11 may then be passed across the hub 7, either above or below the same, and the terminal link thereof passed through the slot 13 formed in the straight projecting end 12, and the shackle 14 of any desirable form of padlock 15 is then introduced through the projecting end of the link to prevent its removal when the device is securely locked on the wheel. The length of the chain is such as to lie taut across the projecting end of the hub either above or beneath the same, there being substantially no slack in the chain when the padlock is applied.

It will be seen that when the device is thus applied, the center portion of the curved locking bar 8 will prevent any outward movement of the device relative to the wheel by reason of coming in contact with the knuckle 4, and also that it is impossible for the wheel to turn upon its axis to any appreciable extent for the reason that the bar 8 will strike on either side against the upper and lower arms of the forked end 2, and further that any steering movement of the wheel is prevented by reason of the engagement of the bar 8 between the forked end and the knuckle.

In Figures 5 and 6 there is illustrated a modification of the invention wherein the locking bar 16, formed of the same material, is curved similarly to the bar 8, though of a less diameter, being adapted to engage the wheel in a somewhat different manner, The terminals of the bar are arranged straight or tangential to the body portion, and one of the said ends, as indicated at 17, is considerably longer than the other end 18 and is adapted, when the device is properly applied to the wheel, to pass between the forked end 2 of the front axle 1, either from the front or the rear thereof, and to extend through the same a slight distance, as clearly shown in Figure 6. The other or shorter end of the bar is provided with a suitable aperture for the reception of the central link of a short length of chain 20, the two halves of the latter being just sufficiently long to extend around the projecting portion of the wheel hub 7, and to have the terminal links of the chain in abutting relation for the reception of the shackle of a padlock 15, as will be easily understood by reference to said figures.

From the foregoing it will be seen that a simple, efficient and easily applied or detached locking means has been provided for preventing the theft or unauthorized handling of automobiles, which may be easily manufactured and sold at a low cost, and that the same is capable of use on many different styles of cars and will serve to positively lock the front wheel against revolving.

What is claimed is:

1. A lock for automobiles comprising a rigid bar having a portion adapted to be rigidly held in position between the end of the axle and the steering knuckle located at the end of said axle, an end of the bar extending between and beyond the spokes of the wheel, a chain permanently connected to said end and adapted to engage the hub of the wheel, and means for locking the bar against removal from its engaging position between the end of the axle and the steering knuckle and the chain against removal from its engaging position with the hub.

2. A lock for automobiles, comprising a U-shaped bar to engage between the spokes of one of the wheels and also engage with and pass through the steering knuckle located at the end of the axle and between the said end of the axle and inside hub of a wheel, said U-bar having both arms passed between the spokes and projecting beyond the outer side of the wheel, a chain permanently attached to one end of said bar and passed across and engaging the hub and then through a slot provided at the other end of said bar, and means for locking the chain in place.

In testimony that I claim the foregoing as my own, I have hereto affixed my signature.

HENDERSON PIERCE CHILDRESS.